(12) United States Patent
Dorsch et al.

(10) Patent No.: US 6,450,040 B1
(45) Date of Patent: Sep. 17, 2002

(54) SEMICONDUCTOR FORCE/TORQUE SENSOR

(75) Inventors: Bernd Dorsch, Unterleinleiter; Hans-Peter Hohe, Heiligenstadt; Dieter Seitzer, Erlangen, all of (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/600,422
(22) PCT Filed: Dec. 22, 1998
(86) PCT No.: PCT/EP98/08413
§ 371 (c)(1), (2), (4) Date: Aug. 22, 2000
(87) PCT Pub. No.: WO99/45349
PCT Pub. Date: Sep. 10, 1999

(30) Foreign Application Priority Data

Mar. 3, 1998 (DE) .......................................... 198 08 928

(51) Int. Cl.$^7$ ................................................ G01B 7/16
(52) U.S. Cl. ........................................................ 73/777
(58) Field of Search .......................... 73/763, 774, 775, 73/777, 782, 795

(56) References Cited

U.S. PATENT DOCUMENTS

| 3,145,563 A | 8/1964 | Hollander, Jr. | |
|---|---|---|---|
| 3,251,222 A | 5/1966 | Fenner | |
| 3,355,935 A | 12/1967 | Grosvalet | |
| 3,582,690 A | * 6/1971 | Yerman | 257/254 |
| 3,585,415 A | 6/1971 | Muller et al. | 310/8 |
| 3,761,784 A | * 9/1973 | Jund | 257/254 |
| 4,480,488 A | * 11/1984 | Read et al. | 257/418 |
| 5,770,803 A | * 6/1998 | Saito | 257/254 |
| 5,886,543 A | * 3/1999 | Moody | 327/434 |

FOREIGN PATENT DOCUMENTS

| DE | 2714032 | 3/1977 | .......... H01L/41/10 |
|---|---|---|---|
| EP | 024 035 | 2/1981 | .......... H01L/27/20 |
| EP | 303 875 | 2/1989 | ............. G01L/1/18 |
| EP | 647 832 | 4/1995 | ............. G01D/5/16 |

* cited by examiner

*Primary Examiner*—Max Noori
(74) *Attorney, Agent, or Firm*—Michael A. Glenn

(57) ABSTRACT

A force/torque sensor has a semiconductor region which is adapted to be subjected to a force or torque. Two control electrodes are provided on a first and a second side of the semiconductor region, the sides being arranged in spaced, opposed relationship with one another, and a current through the semiconductor region being producible between the control electrodes. Two sensor electrodes are provided on a third and a fourth side of the semiconductor region, the sides being also arranged in spaced, opposed relationship with one another and extending essentially at right angles to said first and second sides. A force or torque applied to the semiconductor region is determinable by detecting a voltage present between the sensor electrodes when a current flows between the control electrodes. The semiconductor region is formed by the channel of a field effect transistor, the drain an source electrodes of said field effect transistor defining the control electrodes.

3 Claims, 1 Drawing Sheet

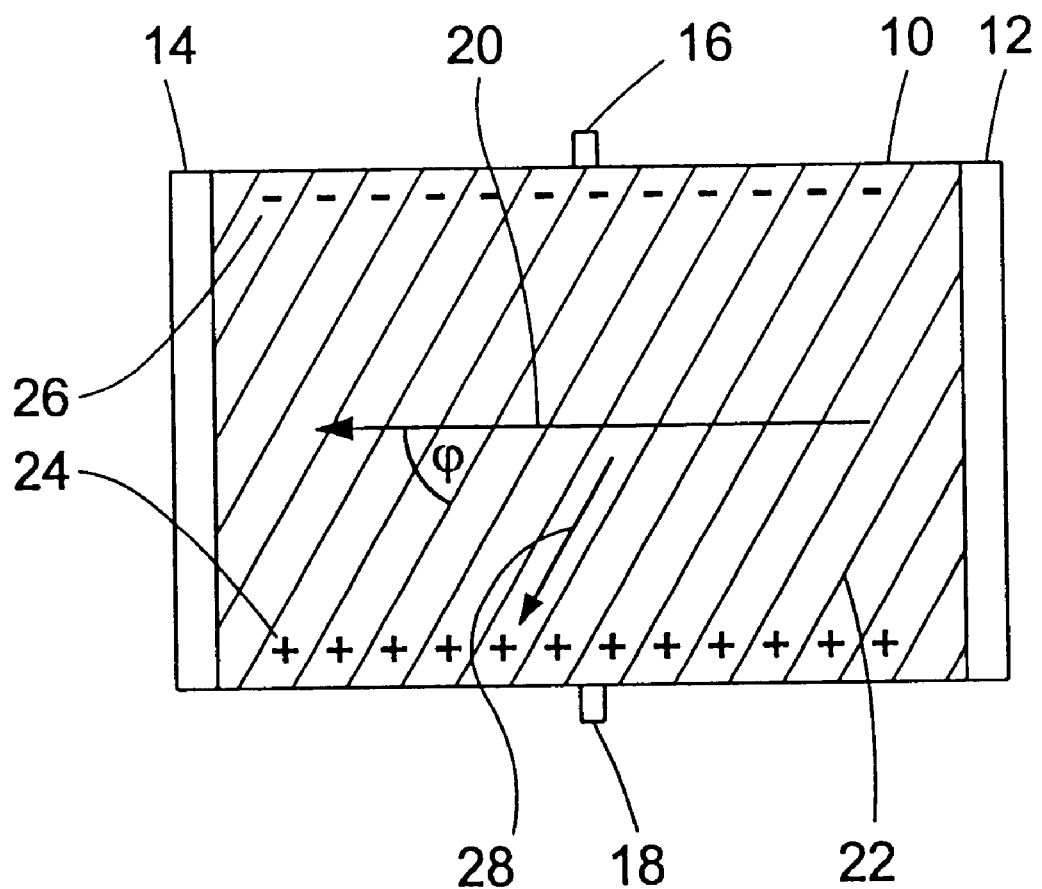

SEMICONDUCTOR FORCE/TORQUE SENSOR

BACKGROUND OF THE INVENTION

1. Field of the Invention

The present invention relates to a force/torque sensor and especially to a monolithically integrated force/torque sensor.

2. Description of Prior Art

The prior art discloses a great number of force sensors. Known monolithically integrated force sensors work on the basis of the piezoelectric effect. Such sensors comprise a piezoelectric converter which converts a force acting thereon into a voltage. Hence, a sensor signal indicative of the force applied can be obtained by detecting this voltage.

SUMMARY OF THE INVENTION

It is the object of the present invention to provide a new monolithically integrated force/torque sensor having an improved sensitivity and an improved response.

This object is achieved by a monolithically integrated force/torque sensor comprising a semiconductor region which is adapted to be subjected to a force or torque. Two control electrodes are provided on a first and a second side of the semiconductor region, these first and second sides being arranged in spaced, opposed relationship with one another. A current can be produced between the control electrodes. In addition, two sensor electrodes are provided, which are arranged on a third and a fourth side of the semiconductor region, these third and fourth sides being arranged in spaced, opposed relationship with one another and extend essentially at right angles to said first and second sides. A force or torque applied to the semiconductor region is determinable by detecting a voltage present between the sensor electrodes when a current flows between the control electrodes. The semiconductor region is formed by the channel of a field effect transistor, the drain an source electrodes of said field effect transistor defining the control electrodes.

The present invention is based on the finding that, when a force acts on the semiconductor region, a direction of lower resistance will be created parallel to the direction of dilation, i.e. the direction in which the interatomic distances are enlarged by the action of force. This direction of lower resistance causes a deflection of the current present between the two control electrodes. When this direction of lower resistance between the two sensor contacts, which are located on the third and fourth sides of the semiconductor region, is oriented in a suitable manner, respective charges of opposite polarity will be produced on the third and fourth sides; these charges can be measured as a voltage difference between the sensor contacts.

According to one embodiment of the present invention, the semiconductor region is doped in a suitable manner for permitting the flow of a current between the two control contacts. According to the present invention the integrated force sensor is formed by a field effect transistor, the drain electrode and the source electrode of this field effect transistor being used as the two control contacts. By means of the drain electrode, the source electrode and the gate electrode, a suitable drain current, i.e. a suitable current between the two control contacts, can be adjusted. The opposed longitudinal sides of the channel region have additionally attached thereto the sensor contacts, the channel region being used as the semiconductor region of the sensor according to the present invention.

BRIEF DESCRIPTION OF THE DRAWING

In the following, preferred embodiments of the present invention are explained in detail; part of this explanation refers to the drawing enclosed.

The only FIGURE shows a schematic representation of a preferred embodiment of the sensor according to the present invention.

DESCRIPTION OF PREFERRED EMBODIMENTS OF THE INVENTION

In the embodiment shown, the sensor according to the present invention is provided with a doped semiconductor region 10 having a substantially rectangular shape. Two opposed lateral surfaces of the semiconductor region 10 have electrodes 12 and 14 attached thereto, which serve as control contacts. As can be seen in the FIGURE, the control contacts 12 and 14 are arranged in spaced relationship with one another, the semiconductor region 10 being arranged between them. Electrodes 16 and 18, which serve as sensor electrodes, are attached to lateral surfaces of the semiconductor region 10, the lateral surfaces being again arranged in spaced relationship with one another. In the case of the embodiment shown, the lateral surfaces having the sensor contacts 16 and 18 attached thereto are arranged at an angle of substantially 90° to the lateral surfaces having the control contacts 12 and 14 attached thereto. Hence, the lateral surfaces having the sensor contacts 16 and 18 attached thereto interconnect the lateral surfaces having the control contacts 12 and 14 attached thereto.

It is, however, obvious that the above-described arrangement is only an example; other suitable arrangements can be used and the semiconductor region may have an almost arbitrary geometry as long as two spaced lateral surfaces are defined, which have the control contacts attached thereto, and as long as spaced lateral surfaces are defined, which have the sensor contacts attached thereto.

In the following, the mode of operation of the sensor according to the present invention will now be explained on the basis of the example shown in the FIGURE.

The two opposed control contacts 12 and 14 are operated with a suitable control voltage or a suitable control current for causing a flow of current through the doped semiconductor region 10. This flow of current is indicated by arrow 20 in the FIGURE When a force acts on the semiconductor region 10, a direction of lower resistance will be created in the semiconductor region parallel to the direction of dilation, i.e. the direction in which the interatomic distances are enlarged by the action of force; when oriented in a suitable manner, this direction of lower resistance will cause a deflection of the current 20 flowing through the semiconductor region 10. The direction of dilation depends on the direction of the force acting on the semiconductor region as well as on the nature of this force. In the FIGURE the lines of the lower resistance are shown at 22.

Due to the deflection of the current flow 20 in the semiconductor region 10, charges 24 and 26 are produced at the edges of the semiconductor region 10 which have the sensor contacts 16 and 18 attached thereto. The charges produced on the side of the sensor contact 18 are, for example, positive charges 24, whereas negative charges 26 are produced on the side of the sensor contact 16. The aimed-at current direction for producing these charges 24 and 26 is shown at 28 and extends along the lines of lower resistance 22.

The charges 24 and 26 produced at the edges of the semiconductor region 10 can be detected via the sensor contacts 16 and 18 as a voltage difference and, consequently, as an output signal of the force/torque sensor according to the present invention. The angle φ defined between the original current direction 20 and the direction of dilation, which is shown by the lines of lower resistance 22, influences the magnitude of the output signal. The effect underlying the force/torque sensor according to the present invention will be greatest at an angle φ of 45°, whereas this effect will tend to zero if the angle approaches 0° or 90°. Hence, it will be advantageous to choose the subjectibility of the semiconductor region to a force in such a way that the angle ψ between the direction of dilation of the semiconductor region and the current flow is essentially 45°. The highest possible sensitivity of the force/torque sensor can be achieved in this way.

Alternatively to the embodiment explained hereinbefore with reference to the FIGURE the sensor according to the present invention can also be realized by means of a field effect transistor. In this case, the semiconductor region is formed by the channel of the field effect transistor. The drain electrode and the source electrode define the two control contacts. A suitable drain current is produced via these via these control contacts and the gate electrode of the field effect transistor. Furthermore, sensor contacts are additionally attached to opposed longitudinal sides of the channel region. Also in this case, the action of force on the field effect transistor, i.e. on the channel thereof, gives rise to lines of a lower resistance which extend parallel to the direction of dilation and which cause a deflection of the drain current and, consequently, an accumulation of charges on the edges of the channel. These charges can again be detected via the sensor contacts so as to produce the sensor output signal.

Suitable circuit arrangements for generating the drive currents and for detecting the output signal of the monolithically integrated force/torque sensors according to the present invention are obvious to those skilled in the art. The output voltage of the force/torque sensor according to the present invention is proportional to the force exerted or to a torque applied so that a simple processing circuit can be used for evaluating the output signal. In addition, the monolithically integrated force/torque sensor according to the present invention can be produced easily making use of methods in the field of semiconductor technology and it can, integrated with electronics, be realized in an integrated circuit according to requirements.

What is claimed is:

1. A monolithically integrated force/torque sensor comprising:
    a semiconductor region which is adapted to be subjected to a force or torque;
    two control electrodes which are provided on a first and a second side of the semiconductor region, said sides being arranged in spaced, opposed relationship with one another, and a current through the semiconductor region being producible between said control electrodes;
    two sensor electrodes which are provided on a third and a fourth side of the semiconductor region, said sides being arranged in spaced, opposed relationship with one another and extending essentially at right angles to said first and second sides,
    a force or torque applied to the semiconductor region being determinable by detecting a voltage present between the sensor electrodes when a current flows between the control electrodes, and
    said semiconductor region being formed by the channel of a field effect transistor, the drain and source electrodes of said field effect transistor defining the control electrodes.

2. A force/torque sensor according to claim 1, wherein the semiconductor region is doped.

3. A monolithically integrated force/torque sensor according to claim 1, wherein the subjectibility of the semiconductor region (10) to a force is such that an angle (φ) between the direction of dilation of the semiconductor region (10) and the flow of current is essentially 45°.

* * * * *